April 3, 1928.  1,664,963

H. V. ATWELL

LIQUID SEAL

Filed Feb. 14, 1927

Inventor:
H. V. Atwell,
By Dyrenforth, Lee, Chritton & Wiles
Attys.

Patented Apr. 3, 1928.

1,664,963

UNITED STATES PATENT OFFICE.

HAROLD V. ATWELL, OF WHITING, INDIANA, ASSIGNOR TO STANDARD OIL COMPANY, OF WHITING, INDIANA, A CORPORATION OF INDIANA.

LIQUID SEAL.

Application filed February 14, 1927. Serial No. 168,059.

This invention relates to improvements in sealing devices and more particularly to seals for storage tanks containing volatile liquids such as gasoline, petroleum and the like.

Figure 1:
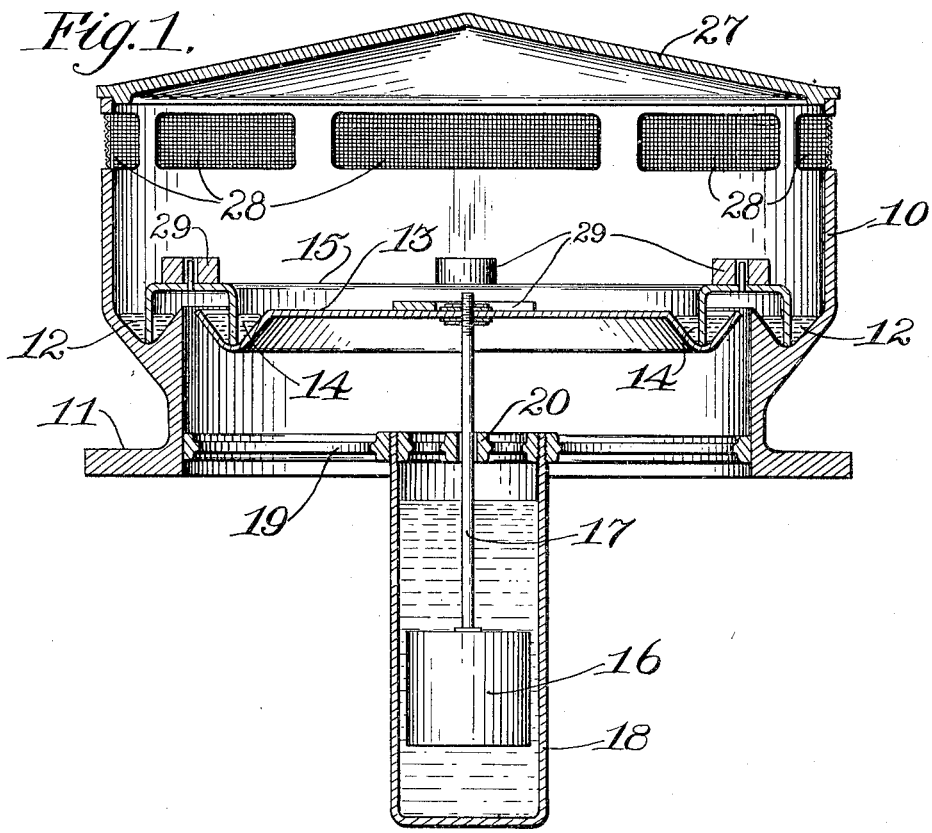
Figure 2:
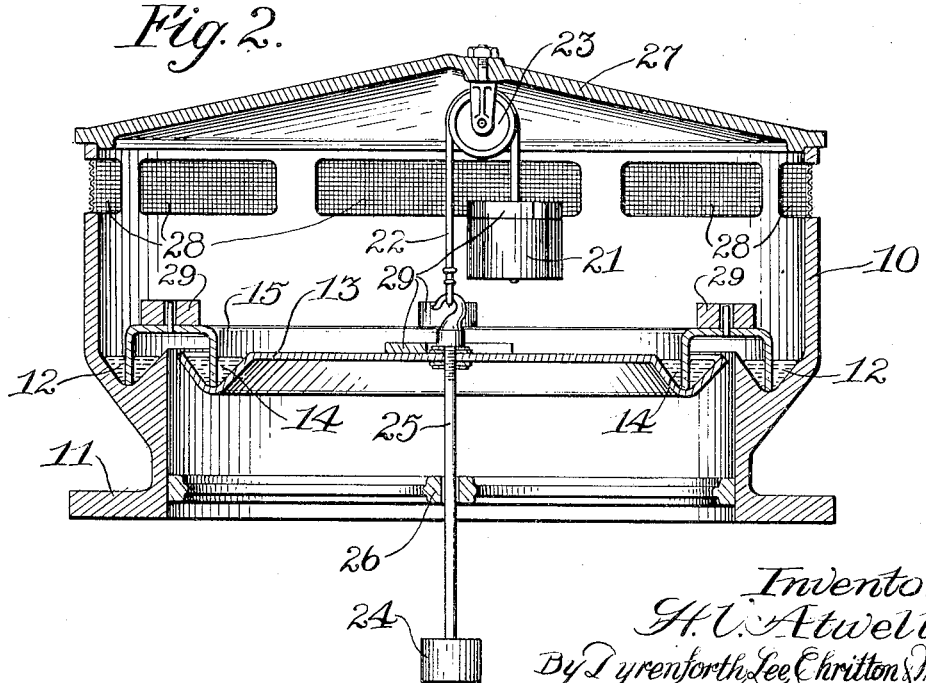

The invention will be fully understood from the following description in conjunction with the accompanying drawings, in which:

Figure 1 illustrates a sectional elevation of a preferred embodiment of a seal according to the invention; and Fig. 2 illustrates a similar view of a modified form thereof.

Referring to the drawings, 10 designates a housing for the device which may suitably be a casting provided with a flange 11 by means of which it may be attached to a vapor space of a storage tank or a conduit communicating therewith. The housing 10 is provided internally with a circumferential channel 12 which is adapted to retain suitable sealing liquid. Within the housing and preferably about the same level as the channel 12 is located a horizontal pressure plate 13 which occupies a substantial part of the cross-sectional area of the housing. The plate 13 is provided with a peripheral channel 14 adapted to contain sealing liquid. A closure member 15 is arranged above the plate 13 so as to co-operate with the liquid in channels 12 and 14, so as to close the outlet through the housing 10. This closure member may suitably be a ring of inverted U-shape cross-section, so arranged, that the normal closed position of the sealing device, the outer skirt of the ring dips into the sealing liquid in channel 12 and the inner skirt dips into the liquid in channel 14.

As shown in Fig. 1, the plate 13 is supported in its normal position by a float 16 to which it is connected by a rod 17. The float 16 is submerged in liquid in a container 18 suitably supported, for example, by a spider 19, extending from the housing 10. Suitable guide means 20 for the rod 17 may be provided above the container 18 for the purpose of ensuring proper co-operation between the moving parts of the device. It is preferred to employ a float which occupies a substantial part of the cross-sectional area of the container 18 so that a slight dash pot effect is applied to the movement of the plate 13.

A suitable liquid for use in the container is a solution of glycerine in approximate equilibrium under average conditions of use of the device.

In the form shown in Fig. 2, the support of the plate 13 may be effected by a weight 21 connected to the plate 13 by a cord 22 which passes over a suitable pulley 23. In order to ensure stable equilibrium of the plate 13, especially in its open position, it is preferred to provide a weight 24 dependent therefrom by means of a rigid rod 25. Suitable guide means 26, extending from the housing 10, may also be provided to engage the rod 25 and serve to maintain the plate 14 in proper co-operative relationship with the other parts of the seal.

The housing is preferably surmounted by a cover 27 and is provided with openings 28, preferably gauze-covered, to prevent admission of foreign bodies and the passage of flame.

The apparatus described requires a very small quantity of sealing liquid and it is preferred to use mercury. Other sealing liquids, such as glycerine and calcium chloride solutions and the like may be employed.

The pressure differences under which the seal will operate may be predetermined by suitably proportioning the relative effective areas and weights of the plate 13 and the ring 15, and the buoyancy of the float 16 (Fig. 1) or the mass of the counter-weight 21 (Fig. 2). In order to permit ready adjustment of the operating pressure differences, the plate 13, the ring 15 and counterpoise weight 21 may be provided with such removable weights 29 as may be necessary to ensure the desired operation.

The operation is as follows. When the pressure in the storage tank exceeds atmospheric pressure by a certain amount, the excess pressure on the underside of plate 13 and ring 15, together with the buoyancy of the float 16 (Fig. 1) or the force of counterpoise weight 21 (Fig. 2) overcomes the weight of the ring, plate and parts carried thereby so that they rise and the outer skirt of the ring 15 is thereby withdrawn from the sealing liquid in channel 12, permitting venting to the atmosphere through openings 28. When the pressure difference has thus been reduced below the amount aforesaid, the parts resume their normal closed position.

When the pressure of the atmosphere exceeds that in the storage tank by a certain amount so that the excess pressure on the upper side of plate 13, together with the weight of the plate overcomes the buoyancy of the float (Fig. 1) or the force of the counterpoise weight 21 (Fig. 2), the plate 13 descends, withdrawing the liquid of the channel 14 from the inner skirt of ring 15, thereby permitting air to pass thereunder into the storage system. When the pressure difference has thus been reduced below the amount aforesaid, the parts resume their normal closed position.

While the invention has been described in connection with a specific embodiment it must be understood that the invention is not intended to be limited thereto, except by the terms of the appended claims.

I claim:

1. In a liquid seal, in combination, an outlet, a channel surrounding said outlet and adapted to receive sealing liquid, a pressure responsive member in said outlet adapted to move in opposite directions under the action of excess pressure on its respective sides, said member being provided with a channel adapted to receive sealing liquid, means for supporting said member, and a closing member having a plurality of skirts adapted to co-operate with the liquid in said channels.

2. A liquid seal comprising a vapor outlet, a liquid channel surrounding said outlet, a pressure plate in said outlet, a liquid channel on said plate, a double skirted member having a pair of skirts adapted to co-operate with said liquid channels to close the outlet, and means for applying an upward force of predetermined magnitude on said pressure plate.

3. A liquid seal comprising a vapor outlet, a liquid channel around said outlet, a pressure plate in said outlet, a liquid channel on said plate, a closing member adapted to co-operate with liquid in said channels to effect closure of the outlet and adapted to be supported from either of said channels, means for applying an upward force of predetermined magnitude on said plate, so that said member effects closure of the outlet, except when the plate is depressed by a certain excess pressure thereabove or when the plate and member are raised together by a certain excess pressure therebeneath.

4. A liquid seal comprising a vapor outlet, a liquid channel around said outlet, a pressure plate in said outlet, a liquid channel on said plate, an annular member adapted to co-operate with liquid in said channels to effect closure of said outlet, a liquid container adapted to contain liquid, a float submerged in said liquid, and means for supporting said plate from said float so as to maintain it in co-operative relation with said annular member.

5. In combination an outlet passage, a member movable in said passage in opposite directions therein in response to variations in pressure relations on the opposite sides thereof, said movable member being provided with a channel adapted to contain a liquid sealing medium, channel forming means co-operating with the outlet passage to contain a liquid sealing medium, and a closure member co-operating with the channels of the movable member and the channel forming means of the outlet passage to seal the outlet passage, said closure member being movable in one direction with the movable member and being supported in the outlet passage when the movable member is moved in the other direction.

HAROLD V. ATWELL.